United States Patent
Ou (10) Patent No.: US 8,667,557 B2
(45) Date of Patent: *Mar. 4, 2014

(54) INDEPENDENT ROLE BASED AUTHORIZATION IN BOUNDARY INTERFACE ELEMENTS

(75) Inventor: Shukong Ou, Winchester, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,992

(22) Filed: Aug. 21, 2012

(65) Prior Publication Data

US 2012/0317614 A1    Dec. 13, 2012

Related U.S. Application Data

(63) Continuation of application No. 12/313,842, filed on Nov. 25, 2008, now Pat. No. 8,272,029.

(51) Int. Cl.
*H04L 29/06* (2006.01)

(52) U.S. Cl.
USPC ............................................ 726/1

(58) Field of Classification Search
None
See application file for complete search history.

(56) References Cited

U.S. PATENT DOCUMENTS

| 6,073,012 | A  | * | 6/2000 | Vanden Heuvel et al. ..... 455/427 |
| 6,073,172 | A  |   | 6/2000 | Frailong et al. |
| 8,272,029 | B2 | * | 9/2012 | Ou ..................................... 726/1 |
| 2003/0126195 | A1 | * | 7/2003 | Reynolds et al. ............. 709/203 |

OTHER PUBLICATIONS

The United States Patent and Trademark Office, "Office action", issued in connection with U.S. Appl. No. 12/313,842, Oct. 21, 2011, (11 pages).
The United States Patent and Trademark Office, "Notice of Allowance", issued in connection with U.S. Appl. No. 12/313,842, May 21, 2012, (15 pages).

* cited by examiner

*Primary Examiner* — Kaveh Abrishamkar
(74) *Attorney, Agent, or Firm* — Hanley, Flight & Zimmerman, LLC (57) ABSTRACT

Boundary interfaces for communications networks are disclosed. An example method includes configuring, with a processor, a first policy for a first network interface of a computing device in response to an input from a first network administrator of a first network; configuring, with the processor, a second policy for a second network interface of the computing device in response to an input from a second network administrator of a second network, the second network administrator being different than the first network administrator; displaying the second policy to the first network administrator; and displaying the first policy to the second network administrator.

15 Claims, 8 Drawing Sheets

INDEPENDENT ROLE BASED AUTHORIZATION IN BOUNDARY INTERFACE ELEMENTS

RELATED APPLICATION

This patent arises from a continuation of U.S. application Ser. No. 12/313,842, which was filed on Nov. 25, 2008, and issued as U.S. Pat. No. 8,272,029 on Sep. 18, 2012, and is hereby incorporated herein by reference in its entirety.

FIELD OF THE DISCLOSURE

The present disclosure relates generally to computer network security, and more particularly, to devices, systems and methods for improving network security while giving network administrators better visibility, control and auditing ability of network operations by an Independent Role Based Authorization (IRBA) of network boundary interface elements.

BACKGROUND

The use of telecommunications networks has increased dramatically over the past 20 years. The entire world is increasingly reliant on network accessibility for voice, data and video communication, now integral to personal, government, business, education, health and safety communications. Network security concerns regarding the security of personal and confidential information transmitted over communication networks are now foremost in the minds of network service customers, network administrators and network service providers.

Network security consists of the provisions made in an underlying computer network infrastructure, policies employed by the network administrator to protect the network and the network-accessible resources from unauthorized access, and consistent and continuous monitoring and measurement of the actual network performance.

A challenge occurs when interconnected networks, such as those of the Internet, have different levels of network security. For the purposes of description herein, the point where networks interface will be referred to as a Boundary Interface (BI), with the element of the interface, typically hardware, software or some combination of hardware and software, characterized as a Boundary Interface Element (BIE). It is at network BIEs where network security policies are enforced.

At a BIE, one network may wish to only transmit or receive information from another network without allowing the other network direct, two-way access to sensitive networks, sub-networks or network access devices on the network. Safeguards placed within sensitive networks can be used to provide a security boundary that prevents outside access to internal networks, and maintains a zone of integrity, where all information is known to be secure, sanitized and authentic. Such zones of integrity are sometimes referred to as demilitarized zones (DMZs).

Figure 1:
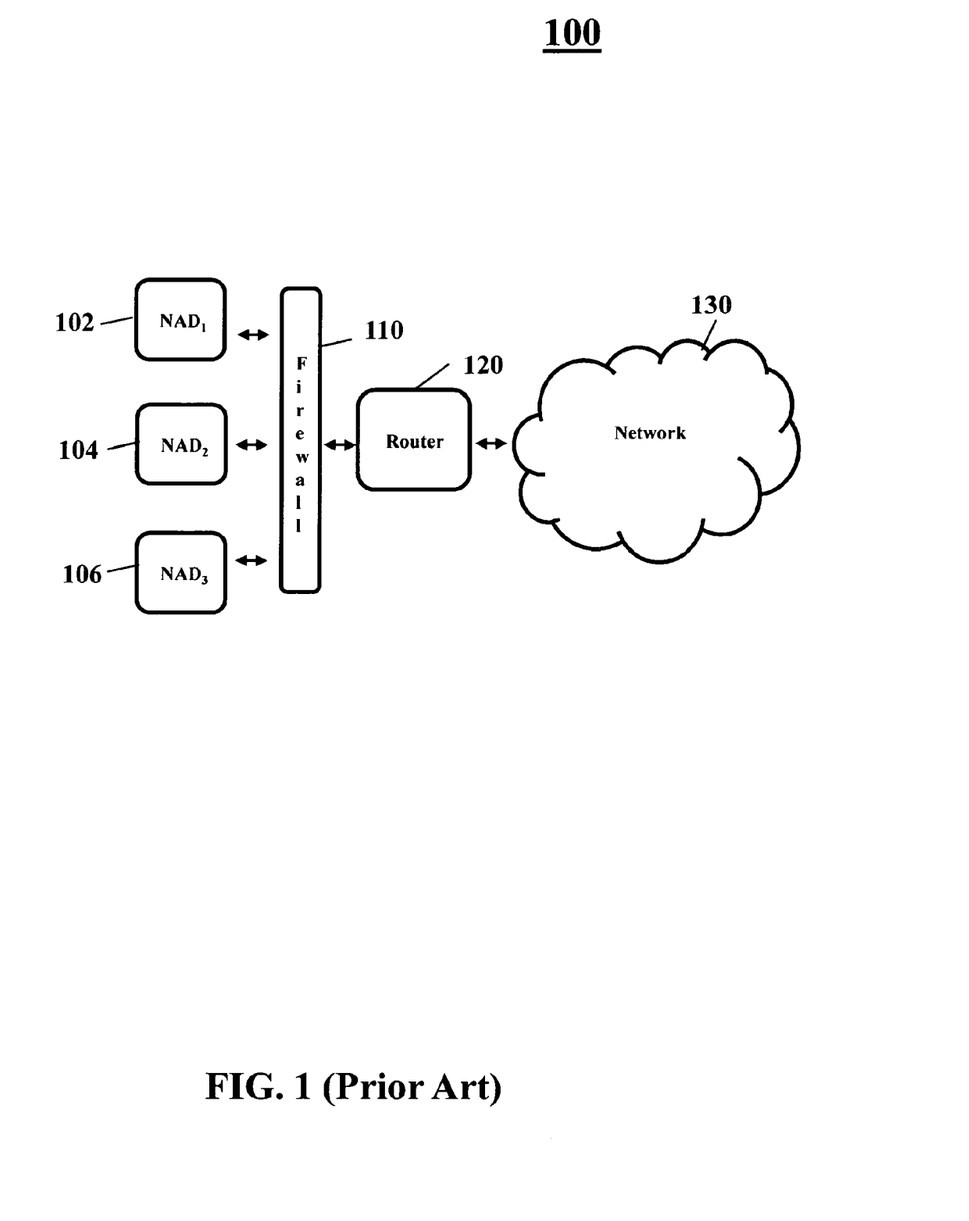
FIG. 1 is a block diagram of a prior art network utilizing a firewall.

In communication networks, information is typically transmitted in the form of data packets. Information present at a network or Website may be accessed by or transmitted to another network or Website by a command originated by either network. Therefore, confidential information needs appropriate safeguards against unauthorized access and/or transmission. Packet filtering is typically implemented by a network component known as a "firewall." FIG. 1 is an example prior art block diagram 100 of a network utilizing a firewall. A plurality of Network Access Devices (NADs) shown as $NAD_1$ 102, $NAD_2$ 104 and $NAD_3$ 106 communicate through a firewall 110 with a router 120, which is coupled to a network 130. The firewall's function is to inspect and filter data packets as specified by the policies specified by the network administrator. As is well known, those packets that pass the policy inspection are allowed to pass through the firewall, while those packets that fail the policy inspection are not allowed to pass through the firewall.

A service customer network administrator typically permits broad access on one side of the firewall, but blocks transmissions in the opposite direction that are not part of an active network session. For example, "inside" company employees could be permitted to have unrestricted access through the firewall to an "outside" network such as the Internet, but access from the Internet is blocked unless it has been specifically authorized. An example of this type of control is a firewall capable of "stateful inspection" of traffic flows. In addition to such a firewall at a corporate boundary or BI of a network, such as the Internet, firewalls can be utilized between networks, and can also be used within a network to protect sub-networks. In each case, security policies developed, implemented and enforced by the network administrator and appropriate hardware/software such as a firewall are typically involved.

Figure 2:
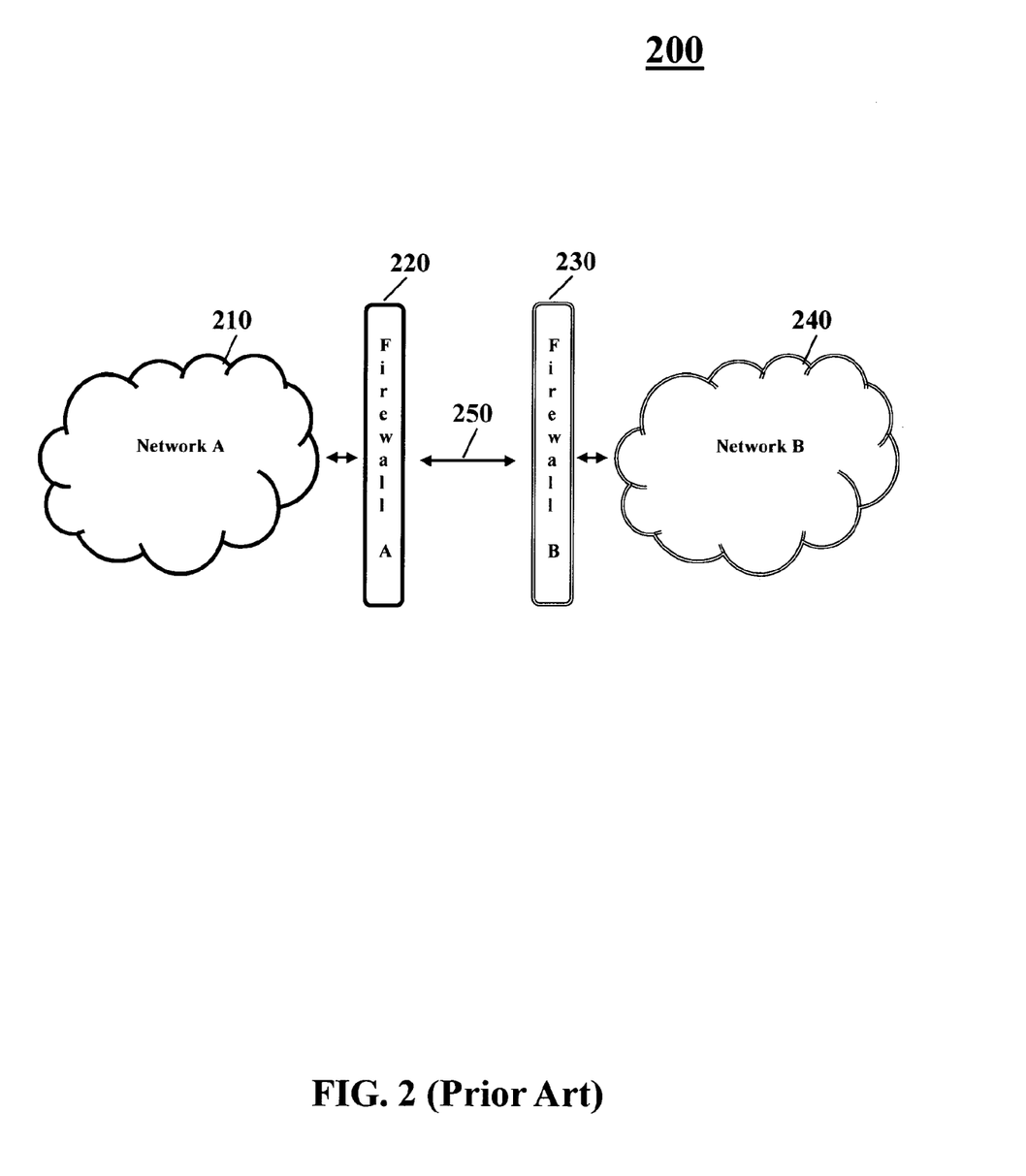
FIG. 2 is a block diagram of prior art networks utilizing back-to-back firewalls.

At every boundary, interface, or border, the scenarios of (1) Provider and Customer interfaces, (2) Business to Business (B2B) interfaces between companies, and (3) Peer to peer and interfaces, there is typically an unbalanced level of authorized control over devices connected to both sides. Balanced control typically requires back-to-back firewalls, each protecting its interface and controlling access from the other. FIG. 2 is an example prior art block diagram 200 of networks utilizing back-to-back firewalls. Network A 210 utilizes security policies implemented by a network administrator for network A that are enforced by its firewall A 220. Likewise, network B 240 utilizes security policies implemented by a network administrator for network B that are enforced by its firewall B 230. The networks interact and implement their respective network security policies at the coupling 250 of the respective BEs (Firewalls 220 and 230). With this configuration, each network administrator retains full and exclusive administrator control over their connection. Each network administrator has neither revealed their interface configuration, nor can see the interface configuration of the interface for the other network. Misaligned policies require both sets firewalls and network administrators to be available simultaneously to resolve a problem. This conventional solution, therefore, is expensive to implement and maintain, and can leave networks vulnerable to a security attack if not actively managed.

As customer's network security policies evolve, the network administrator or corporate Chief Security Officer responsible for a network should refuse to have vendors (e.g. WAN service providers, or other network-related service vendors) be given limitless access to their entire network without positive enforcement of their access. Such access may well come increasingly under scrutiny and could be interpreted as unauthorized access to the customer's network, particularly when managed devices are in many places within the service customer's network.

The challenge for service providers is that service customers are no longer satisfied to let a WAN service provider take the responsibility of making the network connections work, keep them private (not mix with networks that are not authorized to join or access their network), and watch for errors and performance. Not only are service customers getting more technically savvy, but they are coming under increasing regulatory pressures (Federal, state, and industry)—Sarbanes Oxley (SoX), Gramm-Leach-Bliley (GLBA), HIPAA, Payment Card Industry (PCI-DSS), and others, to validate that their financial and other systems are indeed protected and the security, integrity, and confidentiality of their financial and other sensitive data are actively under enforcement methods known to their end users. Service customers, as a result, require more and more access to devices owned and "managed" by the service provider, which reduces the level of control and reduces the confidentiality of the configuration and other security information about those devices. Some extreme interpretations have led service customers to request illogical and unsupportable arrangements such as "co-management", where both service provider and service customer have administrative access to all the BEs and their interfaces. Dispersed authority as allowed under "co-management," where more than one party can alter configurations, similarly disperses responsibility for proper configuration, and as a result reduces the overall security for all parties involved.

Service level agreements become quite untenable when both parties, service providers and service customers, have access to make changes affecting both parties, where either party may execute such a change prior to first seeking agreement and consent of the other party or just executing without telling the other party. This problem is resolved by implementing Independent Role Based Authorization (IRBA) in the boundary interface between the service provider and the service customer.

The challenge for service customers of services, such as WAN services, has been that historically the service provider has been trusted to provide "managed" WAN service. This has typically been comprised of "leased line" commercial communications services where there was no chance of "leakage" or "contamination" of the communications services, so the risk of unauthorized access to managed devices was low. Today, however, high performance and feature-rich communications in a "converged IP" environment may in a single service include private intranet, voice, video, internet, and business partner services. Managed multiprotocol label switching (MPLS) services provide Class Of Service (COS) with Service Level Agreements (SLA's) defining such things as availability (% up-time) and available bandwidth backed up by financial penalties. As a result of this, a service customer network which has outsource management of their WAN and "converged IP" services, has also given up control of BIEs and therefore network security. Although network service providers are (in the US and other countries) required by law to avoid observation of customer data entrusted to the service provider without intervention by law enforcement such as a court order, there is no technical enforcement of the access by associates who are employees of the service provider. Any service provider associate with authorization to log on to a service customer premises router could establish network connections inside the service customer's network. The risk of external access to the service customer's network remains even if the WAN services are down (not available) as an out of band management tool, such as a modem, may have been installed and is likely still active, even as the WAN is down. In this situation, the modem can still be used by an attacker to connect through the service customer's router, and obtain access to the service customer's network without the service provider's knowledge. Passwords and other authentication do have to be known to the attacker to do this, but these data are routinely known to the responsible technicians who work for the service provider.

Service customers should take every reasonable step to protect both their company data and the data of their end users (their customers) confidential. This should extend to equipment and services provided by vendors—including everything done by those vendors. This may be acceptable to the service provider if the service were an extension of the customer's network, but if the service provider's management servers are used to support many customers, it is not appropriate to yield control of the "managed devices." Any device that is not "fully managed,"—i.e. with exclusive device administrative control by the service provider, is potentially at risk of attack and compromise by the service customer or anyone with access to the service customer's network, including visitors, business partners, vendors, outsource workers, consultants, etc. Each party, both service provider and service customer, need to be explicitly clear on what part of the system belongs to them, and to fully accept their responsibility to actively manage those BIEs.

It would therefore be desirable to develop a system, device and method to improve network security while providing network administrators with better visibility, control and auditing capability of network operations by establishing Independent Role Based Authorization (IRBA) of network Boundary Interface Elements (BIEs). To the inventors' knowledge, no such system or method currently exists.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 3:
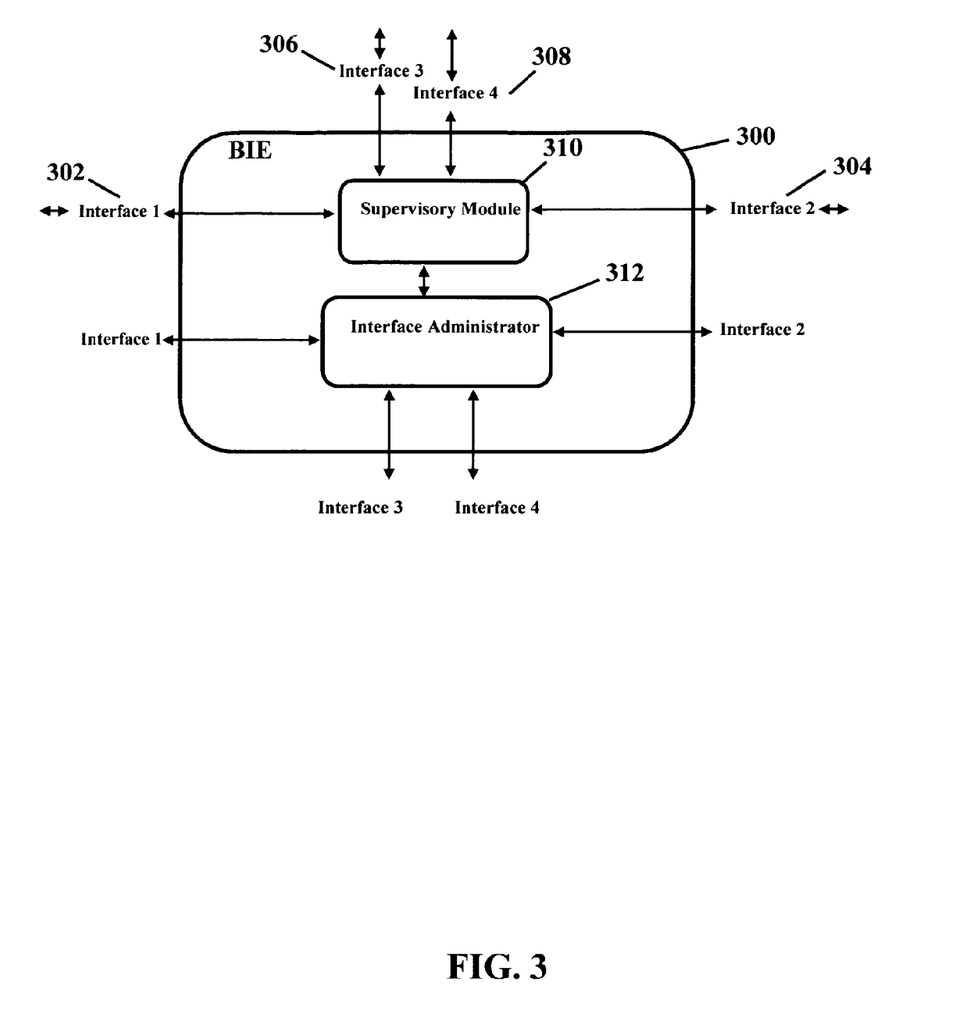
FIG. 3 is a diagram of a boundary interface element in accordance with an aspect of the present invention.

FIG. 3 is a diagram of an example Boundary Interface Element (BIE) 300 in accordance with an aspect of the present invention. The BIE 300 is operative to enforce independent network security policy for each of a plurality of interfaces, virtual or physical, which are limited only by logical processing capacity or physical layout space. The construct of the present invention allows an appropriate role of access enforcement for each interface of the BIE 300 to be independently controlled.

As shown, BIE 300 is a hardware component having a plurality of interfaces (4 interfaces are shown for illustrative purposes): Interface 1 302 to a first network or element (not shown), Interface 2 304 to a second network or element (not shown), Interface 3 306 to a third network or element, and Interface 4 308 to a fourth network or element (not shown). A supervisory module 310 runs the switch software and switching components for switching signals between the multiple interfaces and coordinates communication among the active interfaces under its supervision. An Interface Administrator (IA) 312 is coupled to the supervisory module 310 and may be controlled and administered by each network coupled to its respective interface. The BIE interfaces are security gateways which establish routing, both dynamically based on verified hash values as returned from hash functions or statically, access control by IP addresses and/or protocols, or other network connectivity such as System Network Architecture (SNA). Default settings for interfaces should be "don't permit anything unless it is specifically authorized". Some standard, commonly used settings may allow simple outbound traffic and permit replies to come back into the interface. In accordance with an aspect of the invention, each interface 302, 304, 306 and 308 may be independently controlled by the appropriate "role", that is, the owner of the network connecting to that interface. This forms the foundation for the term "Independent Role Based Authorization." The IA 312 is adapted to independently set the interface security policy and authorize access for each interface. The supervisory module 310 can then coordinate communications among the plurality of active interfaces under its supervision based on the policies set by the IA 312. For example, it can accept route advertisements from each interface, such as "our network over here is 12.13.14.x, if you want to reach those IP addresses, come to our interface", so that only routes advertised by an interface are allowed to be changed by the administrator of that interface, but an interface administrator can read the advertised routes provided by the other interface owners. Thus, a network administrator from a first network who controls Interface 1 302 can configure the IA 312 with particular policies, and view (but not change) the policies established for the other interfaces of the BIE 300 by the other network administrators. The IA 312 may be accessed from a network access device on the networks using well known client-server protocols. Each network administrator is only permitted full supervisory access to make policy changes for a particular interface that serves the network coupled to that interface. However, the interface administrator 312 enables the network administrator to see the configuration rules for the other interfaces. Thus, utilizing a BIE 312 enables each network administrator to retain full and exclusive administrator control over their respective connections. Each network administrator reveals their interface configuration to the other, but can only change the interface configuration for which they have administrative control. This should lead to fewer misaligned policies, with all pertinent network administrators having interface configuration visibility of every BIE.

The BIE in its simplest form can have two interfaces, one administered by a service provider, and the other administered by the service customer. If the service customer does not wish to expand headcount or resources to actively monitor and perform administrative tasks, a "standard service customer profile" can be used on the customer's interface. In such an instance, the service provider's interface is connected to the WAN by either Frame Relay, ATM, Ethernet, or other communications method as are known by those skilled in the art. An out-of-band modem can also be attached to the service provider's interface, in case the primary transport (in line administrative access) is lost or unavailable say due to a cable or fiber cut outside a building.

The following describes three interface scenarios effecting network security that may be addressed by the BIE in accordance with aspects of the present invention.

Provider/Customer Interfaces:

The point of separation or point of demarcation between "providers" and "customers" has been blurred as service providers expand their service offerings from the traditional Wide Area Network (WAN) provider to include Local Area Network (LAN) switch management, IP telephony servers at the customer premises, data traffic detailed reporting and analysis, and data acceleration and caching over WAN connections. Without a clearly identified "boundary element" to serve as the point of demarcation, the identification and authority of control and responsible for enforcing network security policies is ambiguous—effectively a "no man's land" where no one seems to be responsible. One can not presume that the party on the other side of the boundary interface is taking care of enforcing security as it exposes the network to a security attack.

Figure 4:
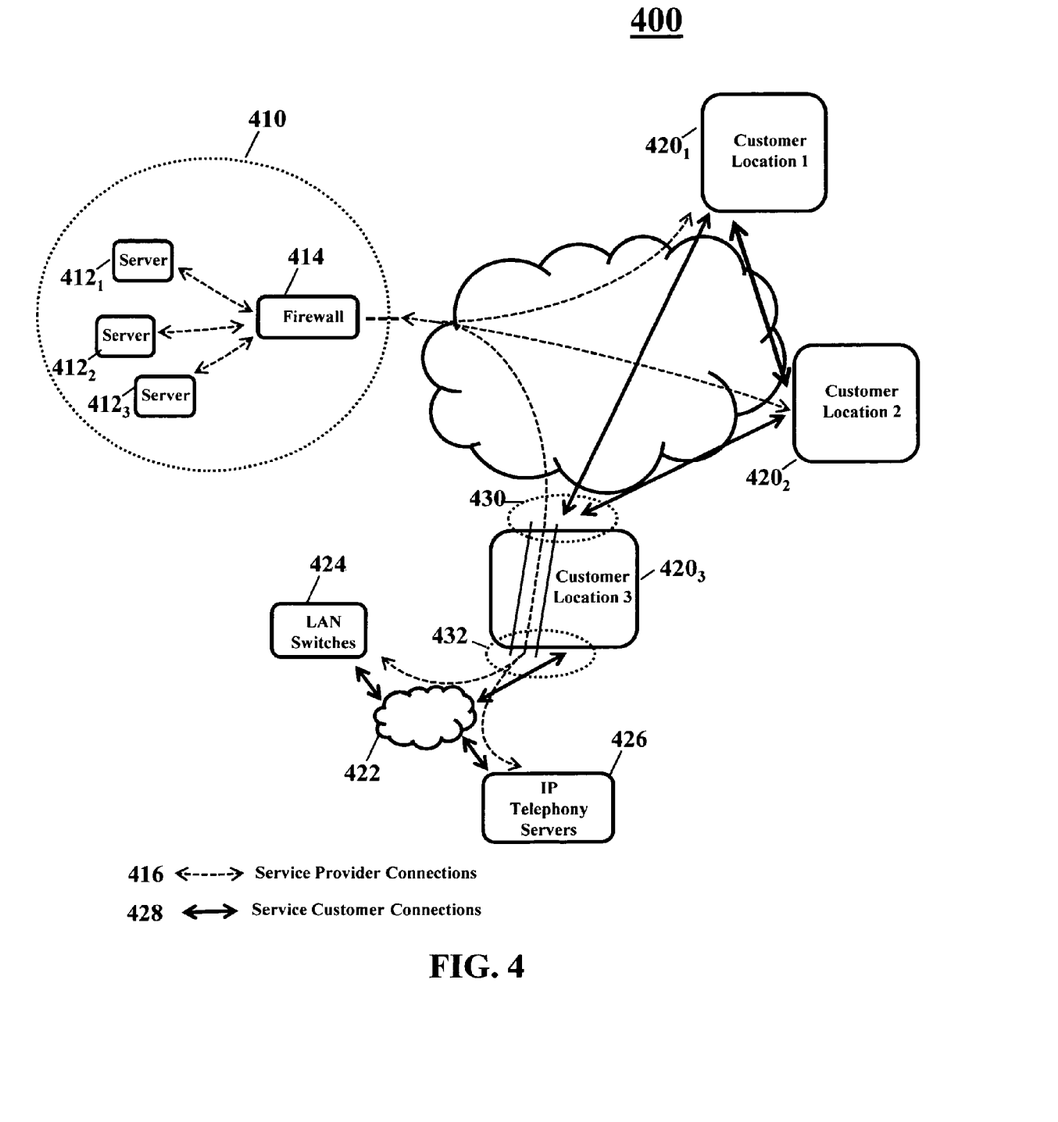
FIG. 4 is a diagram of a provider/customer network in accordance with an aspect of the present invention.

FIG. 4 is a diagram of a provider/customer network 400 in accordance with an aspect of the present invention. A service provider network management center 410 is comprised of a plurality of provider servers 412.sub.1, 412.sub.2 and 412.sub.3, and a firewall 414. The provider servers 412.sub.1, 412.sub.2 and 412.sub.3 may be shared to support multiple customers to reduce provider costs. An example single networked customer has three customer locations 420.sub.1, 420.sub.2 and 420.sub.3. Service provider connections 416 are indicated by dashed arrows, and service customer connections 428 are indicated by solid arrows. The service provider connections 416 couple the service provider network management center 410 with specific customer locations, i.e., 420.sub.1, 420.sub.2 and 420.sub.3, and couple within a customer location to specific parts of the customer network 422, such as in this example, within customer location 3 420.sub.3 to LAN Switches 424 and IP Telephony Servers 426. The points where the service provider connections 416 couple to the customer location 3 420.sub.3, noted as point 430, and the point where the service provider connections couple to the customer network 422, noted as point 432, are points of ambiguity—a "no man's land" which require active management to ensure network security. Thus 430 and 432 may include respective BIEs in accordance with the principles set forth above to implement network management for each interface. The service provider's administrative connections (416 dashed arrows) can be established between 430 and 432 by use of private or virtual private networks such as encrypted IPsec VPN tunnels between 430 and 432. Similar isolation can be achieved by using physically separated cables between 430 and 432. A Virtual LAN (VLAN) can also be used if the physical and logical control of access to the VLAN configuration and access can be validated.

Figure 5:
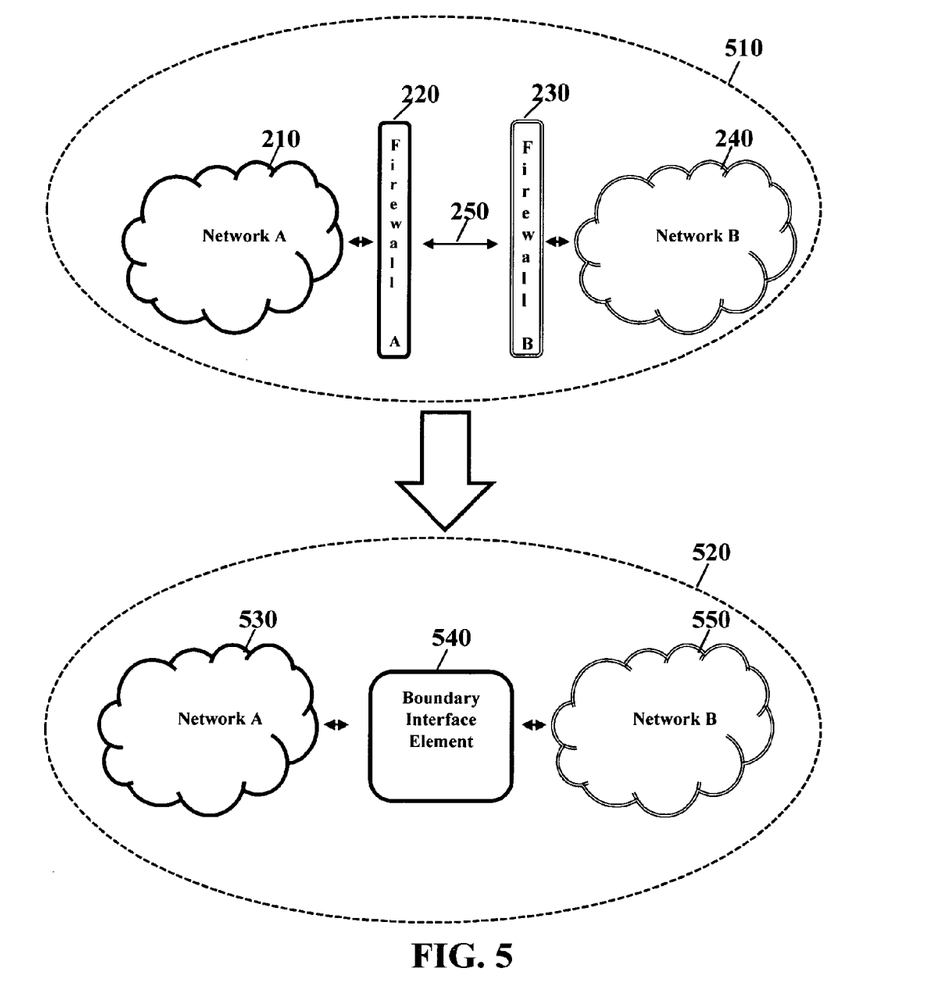
FIG. 5 is a diagram of business-to-business (B2B) network configurations in accordance with an aspect of the present invention.

Business to Business (B2B) Interfaces:

Access control and traffic management permission through B2B interfaces can be enforced by conventional means such as back-to-back firewalls as described in FIG. 2. However, such solutions are expensive (i.e. require more hardware/software, more staff), require active management (i.e. support staff to vigilantly manage the interfaces and support staff needed from both parties to solve problems), and enforcement from both parties. Standardized BIE configurations implementing IRBA can simplify and reduce the cost of enforcing routine B2B connections. FIG. 5 is a diagram of an example Business-to-Business (B2B) network configuration in accordance with an aspect of the present invention. The back-to-back firewall configuration as described in FIG. 2 is shown in FIG. 5 as 510. These firewalls 220, 230 may be replaced by a configuration 520 utilizing a BIE 540. In this configuration, network A 530 is coupled to an interface of the BIE 540, and network B 550 is coupled to a second interface of the BIE 540. In one embodiment, the BIE 540 may be located at the customer premises. Alternatively, the BIE 540 may be disposed "in the cloud", that is, physically located in a data communications center secured by a service provider. In this way, physical access is restricted for both parties and the supervisory module is managed by the service provider.

Figure 6:
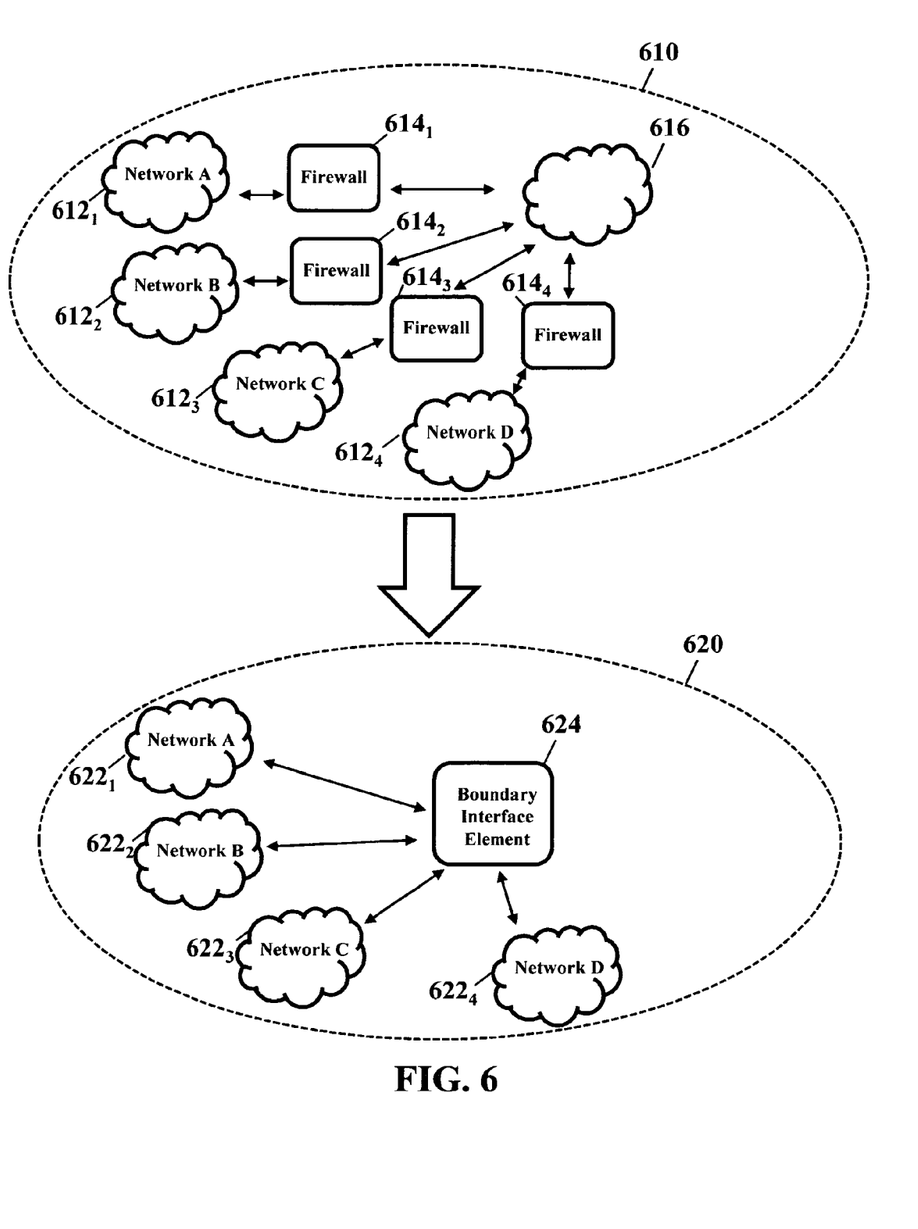
FIG. 6 is a diagram of peer-to-peer network configurations in accordance with an aspect of the present invention.

Peer-to-Peer and Mesh Interfaces:

FIG. 6 is a diagram of peer-to-peer network configurations in accordance with an aspect of the present invention. The current architecture 610 utilizes a firewall for each network in order to protect the same during peer-to-peer communications. In this configuration, networks A $612.sub.1$, B $612.sub.2$, C $612.sub.3$ and D $612.sub.4$, each have their own firewalls $614.sub.1$, $614.sub.2$, $614.sub.3$ and $614.sub.4$ respectively, all of which set security policies with respect to a service provider or other network 616. The challenge associated with this type of relationship is the non-standard and customized configuration and enforcement of uncommon protocols, services, and connections between and among parties in peer networks, which leads to the need for expensive security policy enforcement resources, such as time, money and personnel, to combat network vulnerabilities. In accordance with an aspect of the invention, the individual firewalls of 610 are replaced by a single BIE 624, that resides between networks A $622.sub.1$, B $622.sub.2$, C $622.sub.3$ and D $622.sub.4$. The BIE 624 manages the interfaces and provides a common operating space in order to conduct the peer relationships. Dynamically configured peer-to-peer connections require "on-demand" secure communications. The requirement for a secure interface may be made in a planned manner, such as a planned electronic meeting or made in an unplanned, ad-hoc fashion. Service customers have many external relationships, including anyone with access to the service customer's network, including visitors, business partners, vendors, outsource workers, consultants, etc., all of which need to utilize only secure network interfaces or the networks and data are vulnerable to attack.

Figure 7:
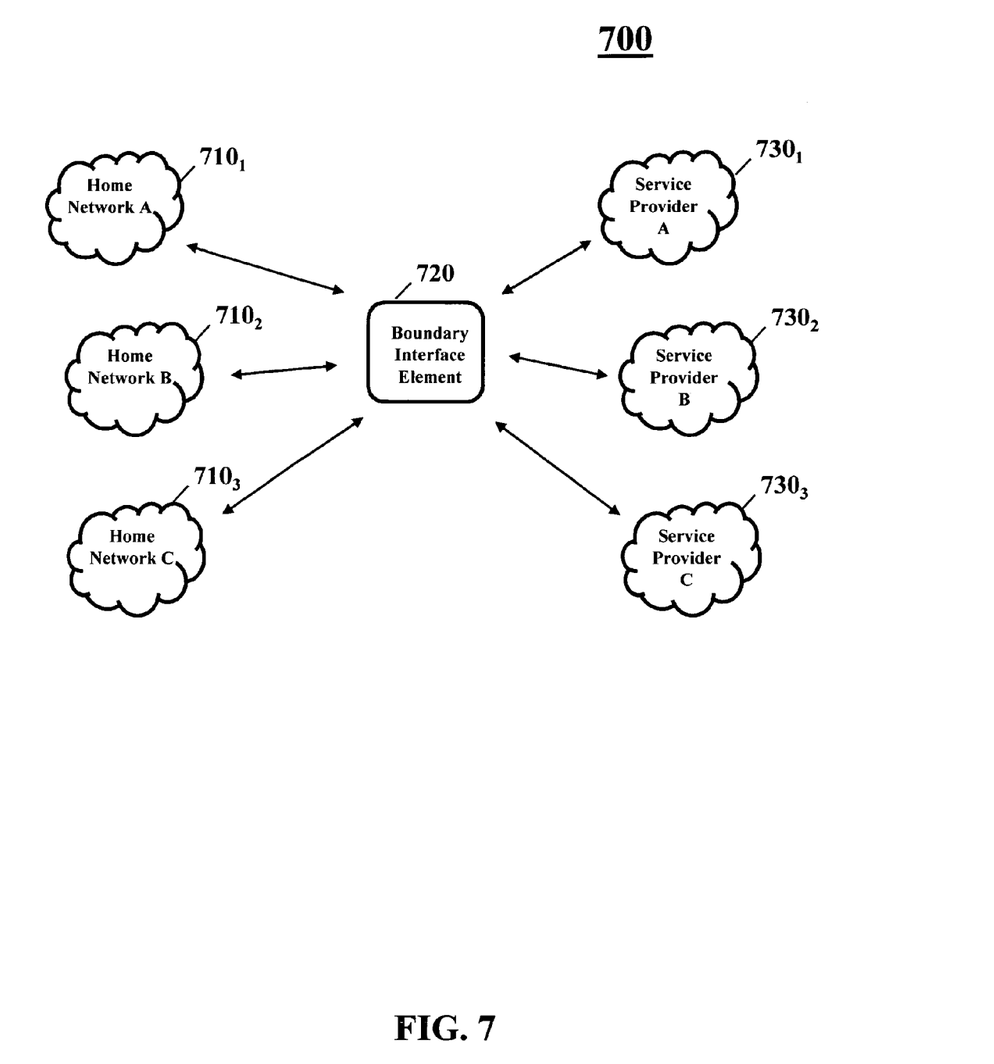
FIG. 7 is a diagram of a mesh network configuration in accordance with an aspect of the present invention.

FIG. 7 is a diagram of a mesh network configuration in accordance with an aspect of the present invention. This configuration can be used to transparently configure a neighborhood mesh network. As shown in FIG. 7, three home networks, A $710.sub.1$, B $710.sub.2$ and C $710.sub.3$ are coupled to a single BIE 720, which is also coupled to three service providers A $730.sub.1$, B $730.sub.2$ and C $730.sub.3$. The BIE 720 enables the respective interfaces to be configured and controlled by each of the three home networks, which can then "share" their service provider access services while each home network is protected from unauthorized access from "outside". Service provider access services are load-balanced and if one service provider fails, the others pick up the load. One benefit of such an arrangement is higher reliability and availability for all of the home networks.

Figure 8:
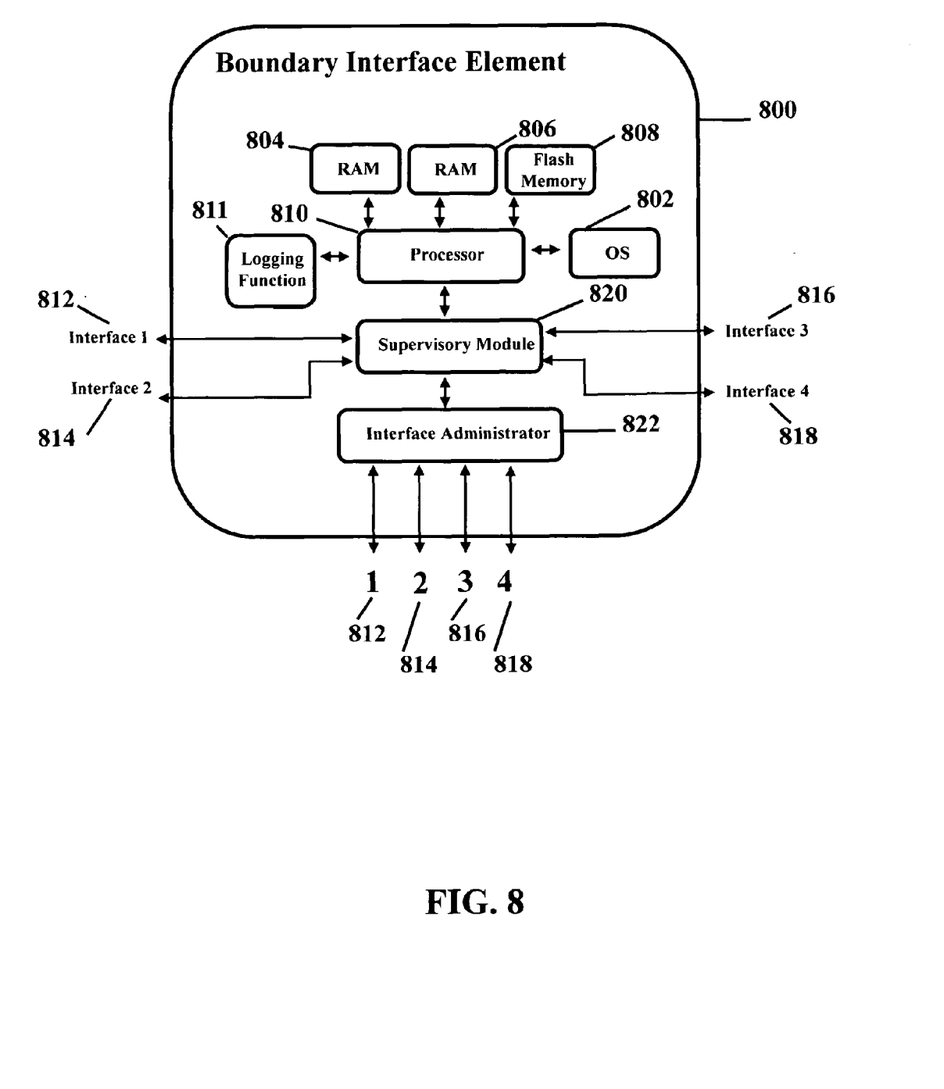
FIG. 8 is a high-level block diagram of an example BIE in accordance with an aspect of the present invention.

FIG. 8 is a high level schematic of a BIE 800, which generally contains an operating system 802, random access memory (RAM) 804, Non-Volatile RAM 806, flash memory 808, one or more processors 810, a logging function 811 and a plurality of network boundary interfaces 812 (Interface 1), 814 (Interface 2), 816 (Interface 3) and 818 (Interface 4). The processor 810 communicates with a supervisory module 820 that controls switching of communications between the interfaces 812, 814, 816 and 818. The method for routing and forwarding packets between and among the interfaces will use industry standard static and dynamic routing protocols that are well known in the art. An interface administrator 822 is coupled to the supervisory module and adapted for enabling, for example, a network administrator for a first network coupled to a first network interface (e.g., 812) of the BIE 800 to configure a policy for the first network interface 812, while restricting access to the second, third and fourth network interfaces (814, 816 or 818) of the BIE 800, and for enabling a network administrator for a second network coupled to the second network interface (i.e., 814) of the boundary interface element to configure a policy for the second network interface while restricting access to the first, third and fourth network interfaces (812, 816 and 818). The logging function 811 generates a log of the interface configurations that is readable by all network administrators but not alterable by any of the network administrators, within practical limits of memory and/or storage. The logging function 811 is depicted schematically as separate element but may be part of the interface administrator 822. The interface administrator 822 may be comprised of software executing on the processor 810 or separate firmware. Likewise, the interface administrator 822 may be combined with the supervisory module 820 in certain embodiments. The interface administrator permits the network administrator of a particular network coupled to the BIE 800 to only configure the interface coupled to that network, while permitting "restricted" access to the remaining interfaces, i.e., only allowing the ability to view the policy configuration for the other interfaces.

In summary, for many situations the expense and complexity of achieving balanced control of BIEs using conventional means have typically persuaded one of the parties to yield control, while permitting the other party to be responsible for the security of the BIE and how signals pass therethrough. "Trusting" the other party is an abdication of responsibility and can be eliminated using the system and methodology disclosed herein. Even if one party wishes to put their data and network resources in the hands of another party, an IRBA module can provide logging and an indisputable audit trail, in a forensic analysis of the actions and activity of the "trusted" party.

The implementation of an IRBA with a BIE can provide numerous benefits. The service provider can positively enforce controls over "network management" access, permitting IP addresses from management servers in a network operations center to reach the "managed" device, and reject all unauthorized access to that interface for administrative purposes.

The service customer can positively block access from the service provider into their network, or if the service provider is supporting additional equipment on the customer's LAN, specific access can be granted from the managed WAN router to the other managed devices on the customer LAN. All other provider access into the customer LAN can be actively and positively prohibited. If the interface were equipped with an intrusion detection system (IDS) or intrusion prevention system (IPS), access control could be supplement by logging the activity of the service provider, establishing an audit trail for later forensic analysis. The out-of-band modem being connected to the provider's interface, would not permit an attacker who knows the static stored passwords to gain access to the customer LAN when the WAN service is not available. Such access would be limited to the service provider's interface.

Utilizing BIEs in B2B connections can significantly reduce the total cost of network security protection when taking into account the cost of firewalls on both networks. Since the BIE may be located in a data communications center secured by a service provider, physical access can be restricted for both parties with the supervisory module being managed only by the service provider.

For peer-to-peer and mesh networks, the cost of multiple firewalls to multiple interfaces can be leveraged to a greater extent when many parties are involved.

The foregoing detailed description is to be understood as being in every respect illustrative and example, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method of managing a network device, the method comprising:
    configuring, with a processor, a first policy for a first network interface of a computing device in response to an input from a first network administrator of a first network;
    configuring, with the processor, a second policy for a second network interface of the computing device in response to an input from a second network administrator of a second network, the second network administrator being different than the first network administrator;
    preventing the first network administrator from specifying settings to be applied to the second policy;
    displaying the second policy to the first network administrator; and
    displaying the first policy to the second network administrator.

2. The method of claim 1, wherein the first network is a service provider network and the second network is a customer network.

3. The method of claim 1, wherein the first network is a first customer network and the second network is a second customer network.

4. The method of claim 1, wherein the first network is a first peer network and the second network is a second peer network.

5. The method of claim 1, further comprising:
    preventing the first network administrator from modifying the second policy; and
    preventing the second network administrator from specifying settings to be applied to the first policy.

6. An apparatus to enable management of a network device, the apparatus comprising:
    a first network interface;
    a second network interface; and
    a processor to:
        respond to an input from a first network administrator to configure a first policy for the first network interface;
        display a second policy for the second network interface to the first network administrator; and
        prevent the first network administrator from specifying settings to be applied to the second policy.

7. The apparatus as described in claim 6, wherein the first network interface is in communication with a first network and the second network interface is in communication with a second network.

8. The apparatus as described in claim 7, wherein the first network is a customer network and the second network is a service provider network.

9. The apparatus as described in claim 7, wherein the first network is a first customer network and the second network is a second customer network.

10. The apparatus as described in claim 6, wherein the processor is to switch network communications between the first network interface and the second network interface.

11. A tangible machine-readable storage device comprising instructions which, when executed, cause a machine to at least:
    configure a first policy for a first network interface of the machine in response to an input from a first network administrator of a first network;
    configure a second policy for a second network interface of the machine in response to an input from a second network administrator of a second network, the second network administrator being different than the first network administrator;
    prevent the first network administrator from specifying settings to be applied to the second policy;
    display the second policy to the first network administrator; and
    display the first policy to the second network administrator.

12. The machine-readable storage device of claim 11, wherein the first network is a service provider network and the second network is a customer network.

13. The machine-readable storage device of claim 11, wherein the first network is a first customer network and the second network is a second customer network.

14. The machine-readable storage device of claim 11, wherein the first network is a first peer network and the second network is a second peer network.

15. The machine-readable storage device of claim 11, further storing instructions which when executed, cause the machine to at least:
    prevent the first network administrator from modifying the second policy; and
    prevent the second network administrator from specifying settings to be applied to the first policy.

* * * * *